April 7, 1953 J. C. GAUDIO 2,634,330

RESISTANCE CAPACITANCE TYPE FILTER NETWORK

Filed Aug. 24, 1949

JAMES C. GAUDIO
*INVENTOR.*

BY Francis W. Crotty

HIS ATTORNEY

Patented Apr. 7, 1953

2,634,330

UNITED STATES PATENT OFFICE 2,634,330

RESISTANCE-CAPACITANCE TYPE FILTER NETWORK

James C. Gaudio, Chicago, Ill., assignor to Zenith Radio Corporation, a corporation of Illinois Application August 24, 1949, Serial No. 111,997

6 Claims. (Cl. 178—44)

This invention relates to an improved electrical filter network and more particularly to such a network employing component elements imprinted upon a dielectric sheet.

One type of printed filter network which has been used previously is of the resistance-capacitance or R-C type, including a thin layer of resistive material disposed on one side of a sheet-like dielectric member and a thin conductive layer disposed on the other side opposite the resistive material. The resistive material, conjointly with the conductive layer, provides a distributed capacitance for the network. Such an R-C network may be employed as a low-pass filter and may be coupled with a utilization circuit. In that case, an input signal is applied between one end of the resistive layer and the conductive layer and an output signal is derived from the other end of the resistive layer and the conductive layer.

To achieve a sufficiently high ohmic resistance in the network, the resistive layer is elongated, preferably having an arcuate configuration in order that the unitary structure may have small over-all dimensions. Such a network, as heretofore constructed, is hampered by undesired stray capacitance comprising the capacitance between the ends of the resistive component, the capacitance between either end and the body of the resistive component, and the capacitance between elemental portions thereof. These stray capacitances may be of such magnitude that at high operating frequencies, the resistive layer is at least partially by-passed and the frequency-response characteristic of the network is impaired. In other words, in utilizing the filter network to provide a low-pass frequency response characteristic and attenuate high frequency signal components, these components are shunted across the resistive layer instead of being dissipated therein and the operation of the network is materially deteriorated.

It is an object of this invention, therefore, to provide an improved filter network which is compact and in which the effect of stray capacitance is reduced by a novel shielding structure.

In accordance with the invention, the filter network comprises a sheet-like member of dielectric material. A first conductive layer of resistive material is disposed on one side of the dielectric member and has a preselected unit resistance. A second conductive layer of low resistivity compared with that of the first layer is disposed on the reverse side of the dielectric member opposite substantially the entirety of the first layer to provide in conjunction therewith a distributed capacitance for the network. Means are provided for maintaining the second conductive layer at a fixed reference potential. The network further includes a third conductive layer having a low resistivity compared with that of the first layer and being disposed on the same side of the dielectric member as the first layer, adjacent to but electrically insulated therefrom. At the same time, the third layer is positioned substantially in its entirety opposite the second layer, thereby to constitute another capacitance with the second layer for maintaining the third layer at substantially the reference potential of the second layer for a given range of frequencies. Thus, the third layer constitutes a shield for the first layer at the operating frequencies.

The features of the present invention which are believed to be novel are set forth with particularity in the appended claims. The present invention itself, both as to its organization and manner of operation, together with further objects and advantages thereof may best be understood by reference to the following description taken in connection with the accompanying drawing in which:

Figures 1, 2:
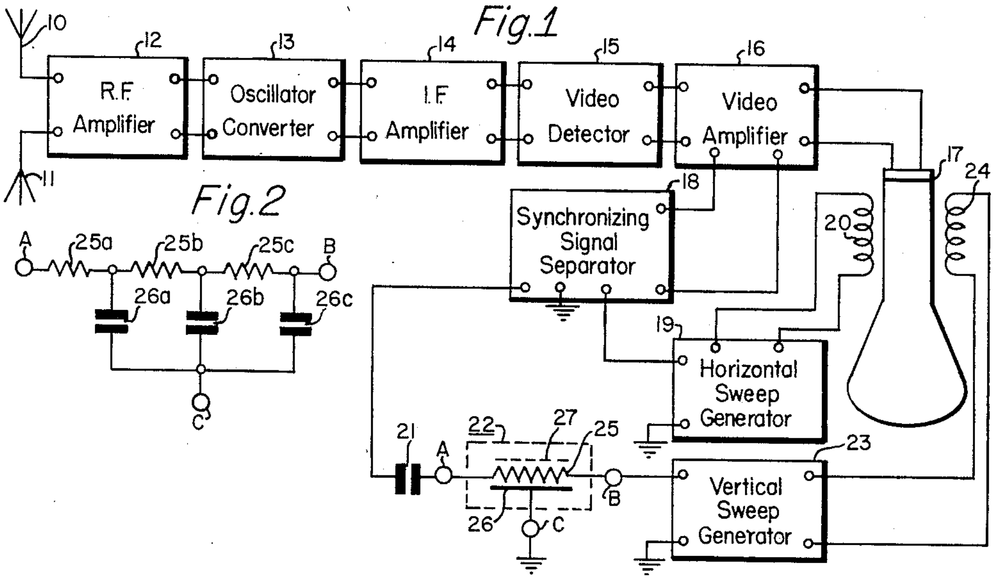
Fig. 1 is a block diagram of a complete television receiver including a schematic representation of a filter network embodying the present invention.
Fig. 2 is a schematic diagram of a filter circuit which is generally similar to that shown in Fig. 1.

Referring to Fig. 1 of the drawing, the television receiver there represented comprises, in cascade, an antenna-ground circuit 10, 11, a radio-frequency amplifier 12, which may include one or more stages of amplification, a frequency changer or oscillator-converter 13, an intermediate-frequency amplifier 14 of one or more stages of amplification, a video detector 15, a video amplifier 16, which may include one or more stages of amplification, and a picture tube 17. The video amplifier 16 further is coupled with a synchronizing-signal separator 18 which, in turn, is coupled with a horizontal-sweep generator 19 and a horizontal-deflection coil 20 of picture tube 17. In addition, the synchronizing-signal separator 18 is coupled through a coupling condenser 21 having a low impedance for synchronizing signal frequencies to the input terminals A and C of a resistance-capacitance type of low-pass filter network 22, constructed in accordance with the invention as will be pointed out more fully hereinafter. The output terminals B and C of filter network 22 are coupled to vertical-sweep generator 23 which, in turn, is coupled to a vertical-deflection coil 24 of picture tube 17.

The above-described arrangement comprises, in general, a conventional television receiver. The operation of such a receiver is well understood in the art so that a description thereof is unnecessary. Filter network 22 as used in this receiver, separates vertical synchronizing signals from a composite signal including both horizontal and vertical synchronizing signal components.

Referring now more particularly to that portion of the receiver which embodies the present invention, filter network 22 includes a resistor 25 connected between terminals A and B. A capacitor plate 26 is connected to terminal C and conjointly with resistor 25 forms a distributed capacitance. Capacitor plate 26 is maintained at a fixed reference potential relative to resistor 25 since it is connected with terminal C which, as illustrated, is grounded. Another capacitor plate 27 forms a capacitance with capacitor plate 26 and provides a desired shielding effect as will be explained fully hereinafter.

The filter circuit of Fig. 2 is generally similar to that of network 22 except that the former comprises lumped constants including series resistors 25*a*, 25*b*, and 25*c* and shunt capacitors 26*a*, 26*b* and 26*c* instead of distributed constants. Both filters function in a like manner and in the television receiver of Fig. 1, horizontal synchronizing signal components are attenuated while vertical synchronizing signal components are integrated before application to vertical sweep generator 23, in a well known manner.

Figure 3:
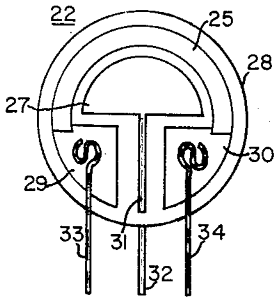
Fig. 3 is a plan view of one side of the unitary structure comprising the filter network shown diagrammatically in Fig. 1.

Referring now to Fig. 3, the unitary structure comprising filter network 22 includes a sheet-like member of dielectric material 28. Member 28 preferably is disc-shaped, although any other configuration is deemed to be within the scope of this invention. The member 28 may be composed of a dielectric material consisting of, for example, barium titanite as the chief ingredient and having a dielectric constant of the order of 1000 or greater and preferably of the order of 4000. However, any known dielectric material having the required dielectric properties may be utilized.

Resistor 25 is comprised of a first, thin, conductive layer of resistive material having a preselected unit resistance and disposed on one side of dielectric member 28. The resistive layer 25 preferably is elongated and is disposed along an arcuate path near the periphery of the disc 28. The resistive element may be a compound including, for example, a graphite, a binder and a filler. However, any resistive compound may be utilized, "aquadag" being another example. The usual silk-screen process, or any other known method may be employed for depositing the resistive material on dielectric 28. Both the composition and physical dimensions of the layer 25 are chosen so that the network has a desired total resistance. In this example, the total resistance of layer 25 is approximately 200,000 ohms.

A pair of terminating conductive segments 29 and 30, each having a low resistivity compared with that of the resistive element 25, are disposed on the same face of member 28 as layer 25 but on another portion thereof. Respective ones of segments 29 and 30 are positioned at opposite ends of resistive element 25 and are electrically connected therewith. The terminating elements 29 and 30 may be composed of metallic silver deposited on member 28 in any well known manner, for example, by the silk screen process.

Figure 4:
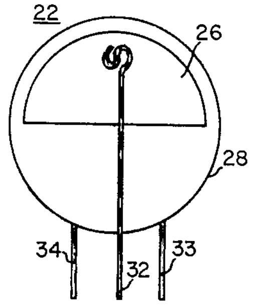
Fig. 4 is a plan view of the reverse side of the structure shown in Fig. 3.

As shown in Fig. 4, a second, thin, conductive layer or electrode 26 of low resistivity compared with that of the resistive element is disposed on the reverse side of member 28, being opposite layer 25. Further, electrode 26 is positioned so that none or only a small percentage thereof is opposite segments 29 and 30. This conductive element under consideration is the capacitor plate or electrode 26, described in connection with Fig. 1 and in conjunction with the resistive element 25 provides a distributed capacitance for network 22. The composition and method for depositing this layer 26 may be similar to that described in connection with the terminating segments 29 and 30.

It will be apparent that the resistive element 25 and the electrode 26, being spaced by a dielectric 28, constitute a capacitance the value of which is determined by the particular dielectric, and the physical configuration and orientation of elements 25 and 26 as is well understood in the art. This capacitance, in conjunction with the resistance of layer 25, is chosen to afford a predetermined filter characteristic. For this example, the filter capacitance value is .004 microfarad; as measured by connecting together the ends of resistance layer 25 through terminating layers 29 and 30. The filter so derived is operative for attenuating horizontal synchronizing signals and for integrating vertical synchronizing signals. These signals are standardized for television transmission at the respective frequencies of 15,750 cycles per second and 60 cycles per second by the Federal Communication Commission.

Referring again to Fig. 3, a third conductive layer 27 of low resistivity compared with that of the resistive element 25 is disposed on the same side of dielectric member 28. This layer 27 corresponds to the shielding capacitor plate 27 described in connection with Fig. 1 and provides another capacitance with layer 26. The shield 27 is concentric with resistor 25, being spaced slightly therefrom so that these elements are insulated from one another but at the same time being electrically coupled. Further, shield 27 is insulated from but electrically coupled to segments 29 and 30. The capacitance value between shield 27 and electrode 26 may be predetermined in the same well known manner as that between electrode 26 and resistor 25. This value is .0025 microfarad for the network of this example. A capacitance value of .0025 microfarad is selected to present a low impedance over a given range of operating frequencies and particularly at the frequency of horizontal synchronizing signal components.

A conductive shield strip 31 is disposed on the same face of disc 28 as is layer 27. Strip 31 is electrically connected with shield 27 and extends therefrom between the conductive terminals 29 and 30. The shield and its extension strip 31 may be of a composition similar to that of terminating elements 29 and 30 and they may be deposited on disc 28 in the same manner as any of the other layer sections.

Three conductive leads 32, 33 and 34 are provided for making electrical connections with respective ones of the elements 26, 29 and 30. The ends of each of these leads which contact the network, per se, are preferably in the form of a reentrant spiral which may be readily soldered to the conductive elements 26, 29 and 30. A soldering compound of 70% lead, 27% tin and 3% silver may be utilized to prevent weakening of the thin conductive elements in the soldering process. These leads are parallel and coplanar, with the leads 33 and 34 on opposite sides of lead 32. Conductor 32, which is connected to ground in the circuit illustrated in Fig. 1, functions as the means for maintaining layer 26 at a fixed reference potential or at ground potential.

Figure 5:
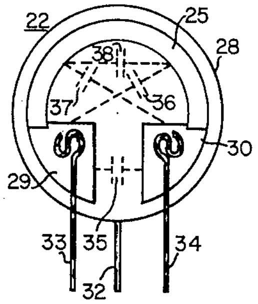
Fig. 5 is another plan view of the structure shown in Fig. 2, with a portion of the structure removed.

Referring to Fig. 5, there is shown a filter network similar to that described, but minus the shield 27 and its extension strip 31. It may be seen that a stray capacitance 35 is formed between terminal segments 29 and 30. Also, stray capacitances 36 and 37 are constituted between each of the terminals 29 and 30 and the body of resistive layer 25. Further, a stray capacitance such as 38 exists across resistor 25 proper. These are the stray capacitances, heretofore mentioned, which impair the frequency response of the network 22.

Now considering the filter network illustrated in Figs. 3 and 4 it is apparent that since electrode 26 is grounded through lead 32, in the circuit of Fig. 1, it is maintained at a fixed reference potential. Shield 27 is maintained at substantially this same reference potential over a given range of operating frequencies, since the capacitance formed between shield 27 and layer 26 has a low impedance at frequencies within the range. Particularly, since the impedance is low at a frequency of 15,750 cycles per second, shield 27 is at the reference potential for the horizontal synchronizing signal frequency. Of course, a direct electrical connection between layers 26 and 27 effectively would maintain shield 27 at the reference potential. Shield strip 31, which is electrically connected with shield electrode 27 also is maintained at this reference potential. Shield 27 and its extension 31, being disposed in the area of disc member 28 across which the several stray capacitances are formed, effect a shielding structure. Furthermore, since lead 32 is interposed between the input and output leads 33 and 34, a more complete shielding of the input and output portions of the network is accomplished even though those portions, in view of the configuration of the network, are close to one another and tend to have intercoupling. Consequently, undesirable stray capacitance is decreased and the filter may function properly to attenuate horizontal synchronizing signal components in the contemplated manner. Therefore, it follows that a compact, unitary filter network may be constructed which is not as subject to the stray capacitance deficiencies as the prior devices.

Figure 6:
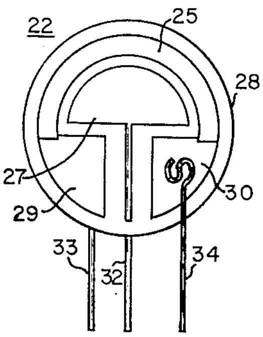
Figs. 6 and 7 are plan views of the two sides of a modified structure comprising a filter network.
Figure 7:
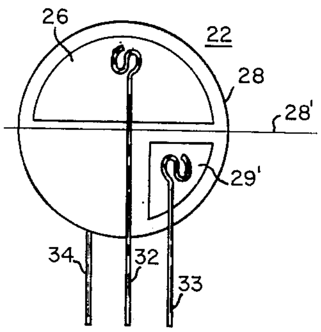

A modification of the filter network of Fig. 1 embodying the invention is shown in Figs. 6 and 7. The modified unit may be employed in the television receiver of Fig. 1 by connecting the leads 32 and 34 to terminals C and B respectively, removing coupling capacitor 21 and connecting lead 33 directly with the synchronizing-signal separator 18. This form of filter network includes a unitary structure similar to that shown in Figs. 2 and 3 and corresponding elements are represented by identical reference numerals. A terminating segment 29′ of conductive material having a low resistivity compared with that of layer 25 is disposed on the same side of member 28 as is layer 26 but opposite terminal 29. Segments 29 and 29′ form a capacitor which has a capacitance value approaching that of capacitor 21 and is employed in its stead. Therefore, the modified arrangement of Figs. 6 and 7 includes a filter network plus a coupling condenser in a unitary device. The construction and utilization of the modified filter network will be readily understood from the description of Figs. 2 and 3.

Although the above-described embodiments disclose the invention as applied to a television receiver, it is to be understood that the invention may be employed in connection with any electronic circuit utilizing such a filter network. For example, the network may be used in association with a hearing aid amplifier to provide a predetermined filter characteristic and yet afford a compact and light weight unit requisite in such equipment.

While particular embodiments of the present invention have been shown and described, it will be obvious to those skilled in the art that changes and modifications may be made without departing from this invention in its broader aspects, and therefore, the aim in the appended claims is to cover all such changes and modifications as fall within the true spirit and scope of this invention.

I claim:

1. A filter network comprising: a sheet-like member of dielectric material; a first conductive layer of resistive material disposed on one side of the dielectric member and having a preselected unit resistance; a second conductive layer, having a low resistivity compared with that of said first layer, disposed on the reverse side of said dielectric member opposite substantially the entirety of said first layer to provide with said first layer a distributed capacitance for the network; means for maintaining said second conductive layer at a fixed reference potential; and a third conductive layer of low resistivity compared with that of said first layer, disposed on said one side of said dielectric member adjacent to but electrically insulated from said first layer, and positioned substantially in its entirety opposite said second layer to provide therewith another capacitance for maintaining said third layer at substantially said reference potential for a given range of operating frequencies, whereby said third layer constitutes a shield for said first layer at said operating frequencies.

2. A filter network comprising: a disc of dielectric material; a first conductive layer of resistive material disposed on one side of the dielectric member along an arcuate path near the periphery of said disc and having a preselected unit resistance; a second conductive layer, having a low resistivity compared with that of said first layer, disposed on the reverse side of said dielectric member opposite said first layer to provide with said first layer a distributed capacitance for the network; means for maintaining said second conductive layer at a fixed reference potential; and a third conductive layer of low resistivity compared with that of said first layer, disposed on said one side of said dielectric member, concentrically positioned relative to said first layer, but electrically insulated therefrom and positioned opposite said second layer to provide therewith another capacitance for maintaining said third layer at substantially said reference potential for a given range of operating frequencies, whereby said third layer constitutes a shield for said first layer at said operating frequencies.

3. A filter network comprising: a sheet-like member of dielectric material; a first elongated conductive layer of resistive material disposed on one side of the dielectric member and having a preselected unit resistance; a pair of conductive segments having a low resistivity compared with that of said first layer disposed on said one side of said dielectric member, each at opposite ends of said first layer and electrically connected therewith; a second conductive layer, having a low resistivity compared with that of said first layer, disposed on the reverse side of said dielectric member opposite substantially only said first layer to provide with said first layer a distributed capacitance for the network; means for maintaining said second conductive layer at a fixed reference potential; a third conductive layer of low resistivity compared with that of said first layer, disposed on said one side of said dielectric member adjacent to but electrically insulated from said first layer, and positioned opposite said second layer to provide therewith another capacitance for maintaining said third layer at substantially said reference potential for a given range of operating frequencies, whereby said third layer constitutes a shield for said first layer at said operating frequencies; and a conductive shield strip disposed on said one side of said dielectric member, electrically connected with said third layer and extending therefrom between said conductive segments for shielding said segments from one another.

4. A filter network comprising: a sheet-like member of dielectric material; a first elongated conductive layer of resistive material disposed on one portion of one side of the dielectric member and having a preselected unit resistance; a pair of conductive segments having a low resistivity compared with that of said first layer and disposed on another portion of said one side of said dielectric member, each at opposite ends of said first layer and electrically connected therewith; a second conductive layer, having a low resistivity compared with that of said first layer, disposed on the reverse side of said dielectric member opposite said first layer and said one portion to provide with said first layer a distributed capacitance for the network; means for maintaining said second conductive layer at a fixed reference potential; a third conductive layer of low resistivity compared with that of said first layer, disposed on said one side of said dielectric member adjacent to but electrically insulated from said first layer and positioned opposite said second layer to provide therewith another capacitance for maintaining said third layer at substantially said reference potential for a given range of operating frequencies, whereby said third layer constitutes a shield for said first layer at said operating frequencies; and a shield strip extending from said third layer between said conductive segments for shielding said segments from one another.

5. A filter network comprising: a sheet-like member of dielectric material; a first elongated conductive layer of resistive material disposed on one side of the dielectric member and having a preselected unit resistance; a pair of conductive segments having a low resistivity compared with that of said first layer and disposed on said one side of said dielectric member, each at opposite ends of said first layer and electrically connected therewith; a second conductive layer, having a low resistivity compared with that of said first layer, disposed on the reverse side of said dielectric member opposite said first layer to provide with said first layer a distributed capacitance for the network; means for maintaining said second conductive layer at a fixed reference potential including a conductive lead electrically connected therewith; a third conductive layer of low resistivity compared with that of said first layer, disposed on said one side of said dielectric member adjacent to but electrically insulated from said first layer and positioned opposite said second layer to provide therewith another capacitance for maintaining said third layer at substantially said reference potential for a given range of operating frequencies, whereby said third layer constitutes a shield for said first layer at said operating frequencies; a conductive shield strip extending from said third layer between said conductive segments for shielding said segments from one another; and two additional conductive leads individually connected with one of said segments and positioned on opposite sides of said first-mentioned lead.

6. A filter network comprising: a sheet-like member of dielectric material; a first conductive layer of resistive material disposed on one side of the dielectric member and having a preselected unit resistance; at least one conductive segment having a low resistivity compared with that of said first layer, disposed on said one side of said dielectric member at one end of said first layer and electrically connected therewith; a second conductive layer, having a low resistivity compared with that of said first layer, disposed on the reverse side of said dielectric member opposite said first layer to provide with said first layer a distributed capacitance for the network; means for maintaining said second conductive layer at a fixed reference potential; a third conductive layer of low resistivity compared with that of said first layer, disposed on said one side of said dielectric member adjacent to but electrically insulated from said first layer and positioned opposite said second layer to provide therewith another capacitance for maintaining said third layer at substantially said reference potential for a given range of operating frequencies, whereby said third layer constitutes a shield for said first layer at said operating frequencies; and a second conductive segment having a low resistivity compared with that of said first layer, disposed on said reverse side of said dielectric member opposite said first segment to provide therewith a coupling capacitance for the network.

JAMES C. GAUDIO.

REFERENCES CITED

The following references are of record in the file of this patent:

UNITED STATES PATENTS

| Number | Name | Date |
|---|---|---|
| 2,464,377 | Cohen et al. | Mar. 15, 1949 |
| 2,493,199 | Khouri et al. | Jan. 3, 1950 |
| 2,523,856 | Baker | Sept. 26, 1950 |
| 2,544,508 | Mackey | Mar. 6, 1951 |